US012471032B2

(12) United States Patent
Regev et al.

(10) Patent No.: US 12,471,032 B2
(45) Date of Patent: Nov. 11, 2025

(54) ADAPTIVE POWER ALLOCATION FOR TX ANTENNA BASED ON ENHANCED CSF REPORT

(71) Applicant: QUALCOMM Incorporated, San Diego, CA (US)

(72) Inventors: Aviv Regev, Tel Aviv (IL); Ronen Shaked, Kfar Saba (IL); Amit Moses, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 18/341,670

(22) Filed: Jun. 26, 2023

(65) Prior Publication Data

US 2024/0430815 A1    Dec. 26, 2024

(51) Int. Cl.
*H04W 52/14* (2009.01)
*H04B 17/309* (2015.01)
(Continued)

(52) U.S. Cl.
CPC ................................ *H04W 52/241* (2013.01)

(58) Field of Classification Search
None
See application file for complete search history.

(56) References Cited

U.S. PATENT DOCUMENTS

| | | | | |
|---|---|---|---|---|
| 2019/0128998 A1* | 5/2019 | Josefsberg | ............ | G01S 13/867 |
| 2020/0228158 A1* | 7/2020 | Lu | ............ | H04B 1/48 |
| 2022/0043108 A1* | 2/2022 | Lavian | ............ | G01S 7/032 |

FOREIGN PATENT DOCUMENTS

| | | | | |
|---|---|---|---|---|
| WO | WO-2020091671 A1 * | 5/2020 | ........... | H04B 7/0639 |
| WO | WO-2021032191 A1 * | 2/2021 | ........... | H04L 5/0094 |

(Continued)

OTHER PUBLICATIONS

Hayashi K., et al., "Transmit Beamforming and Iterative Water-Filling Based on SLNR for OFDMA Systems", IEEE 20th International Symposium on Personal, Indoor and Mobile Radio Communications (PIMRC 2009), IEEE, Piscataway, NJ, USA, Sep. 13, 2009, pp. 1878-1882, XP031660032, section I, p. 1, col. 1, paragraph 2—col. 2, paragraph 1, section III, p. 2, section IV, p. 2, col. 2, paragraph 1.

(Continued)

*Primary Examiner* — Mohammed Rachedine
(74) *Attorney, Agent, or Firm* — Procopio, Cory, Hargreaves & Savitch

(57) ABSTRACT

Apparatus, methods, and computer program products for wireless communication are provided. An example method may include receiving, from a network node, at least one channel state information reference signal (CSI RS). The example method may further include transmitting, to the network node, information indicative of at least one power associated with a post-processing frequency domain residual sideband and a noise per each antenna associated with the UE in a channel state feedback (CSF) report based on the at least one CSI RS. The example method may further include receiving, from the network node, a power allocation configuration based on the information indicative of the at least one power associated with the post-processing frequency domain residual sideband and the noise per each antenna associated with the network node.

30 Claims, 11 Drawing Sheets

(51) Int. Cl.
  *H04B 17/318* (2015.01)
  *H04L 5/00* (2006.01)
  *H04W 52/24* (2009.01)

(56) References Cited

FOREIGN PATENT DOCUMENTS

| WO | WO-2021059237 A1 * | 4/2021 | ............ H04W 24/02 |
| WO | WO-2021253205 A1 * | 12/2021 | ........... H04B 7/0623 |

OTHER PUBLICATIONS

He L., et al., "Pilot-Aided IQ Imbalance Compensation for OFDM Systems Operating Over Doubly Selective Channels", IEEE Transactions on Signal Processing, IEEE, USA, vol. 59, No. 5, May 1, 2011, pp. 2223-2233, XP011353113, abstract section I, p. 1, col. 2, paragraph 3—p. 2, col. 1, paragraph 2 section III section V.
International Search Report and Written Opinion—PCT/US2024/032524—ISA/EPO—Oct. 7, 2024.

* cited by examiner

ADAPTIVE POWER ALLOCATION FOR TX ANTENNA BASED ON ENHANCED CSF REPORT

TECHNICAL FIELD

The present disclosure relates generally to communication systems, and more particularly, to wireless communication systems with adaptive power allocation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include at least one memory and at least one processor coupled to the at least one memory. Based at least in part on stored information that is stored in the at least one memory, the at least one processor is configured to cause the apparatus to receive, from a network node, at least one channel state information reference signal (CSI RS). Based at least in part on stored information that is stored in the at least one memory, the at least one processor is configured to cause the apparatus to transmit, to the network node, information indicative of at least one power associated with a post-processing frequency domain residual sideband and a noise per each antenna associated with the UE in a channel state feedback (CSF) report based on the at least one CSI RS. Based at least in part on stored information that is stored in the at least one memory, the at least one processor is configured to cause the apparatus to receive, from the network node, a power allocation configuration based on the information indicative of the at least one power associated with the post-processing frequency domain residual sideband and the noise per each antenna associated with the network node.

In another aspect of the disclosure, a method, a computer-readable medium, and an apparatus at a network entity are provided. The apparatus may include at least one memory and at least one processor coupled to the at least one memory. Based at least in part on stored information that is stored in the at least one memory, the at least one processor is configured to cause the apparatus to transmit, for a UE, at least one CSI RS. Based at least in part on stored information that is stored in the at least one memory, the at least one processor is configured to cause the apparatus to receive information indicative of at least one power associated with a post-processing frequency domain residual sideband and a noise per each antenna associated with the UE in a CSF report based on the at least one CSI RS. Based at least in part on stored information that is stored in the at least one memory, the at least one processor is configured to cause the apparatus to transmit, for the UE, a power allocation configuration based on the information indicative of the at least one power associated with the post-processing frequency domain residual sideband and the noise per each antenna associated with the network node.

To the accomplishment of the foregoing and related ends, the one or more aspects include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
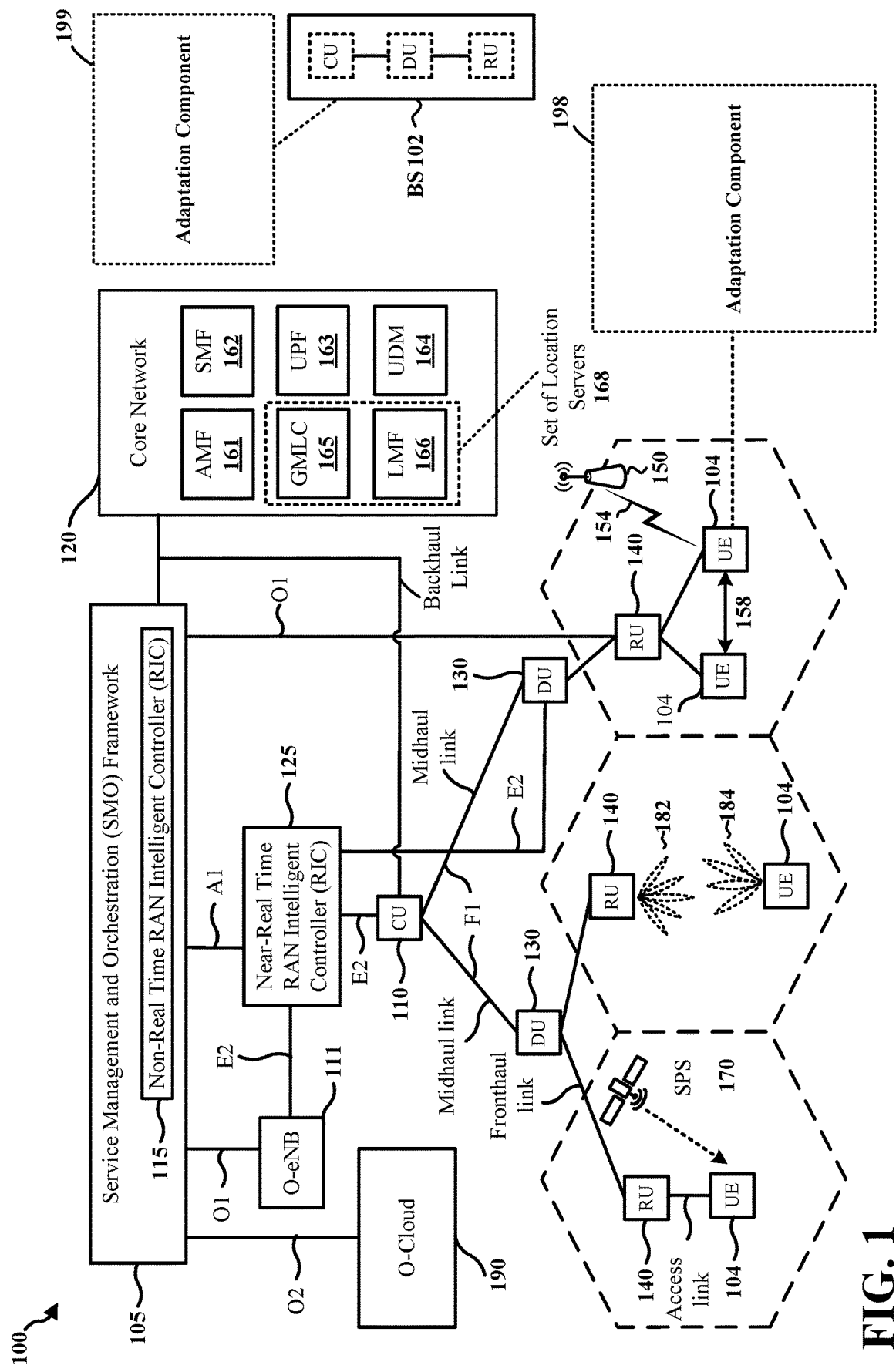
FIG. 1 is a diagram illustrating an example of a wireless communications system and an access network.

A FDRSB may be caused by a Tx in-phase quadrature (IQ) mismatch, which may be an RF impairment that may affect data transmission rate. A residual sideband is generally a signal self-image caused by an IQ imbalance of a mismatched or imperfect mixer. The residual sideband may be a signal having a generally smaller amplitude than the intended signal, appearing at the negative of the frequency of the intended signal. The FDRSB impairment can have more of an effect as the carrier frequency increases. For example, there may be more FDRSB impairment for sub-TeraHertz (THz) communications compared to millimeter wave communications. Similarly, there may be more FDRSB impairment for millimeter wave communications compared to communications based on lower frequency bands. In some wireless communication systems, the FDRSB impairment level may be calibrated for enabling transmission quadrature amplitude modulation (QAM) communications up to 256 QAM, which may be approximately −30 dBc (decibels relative to carrier, which is a power ratio of a signal to a carrier signal, expressed in decibels). For higher QAM modulations, such as 1K QAM, 4K QAM, or 16K QAM, the signal to noise ratio may be high, such as approximately 45 decibels (dB). For these higher QAM modulations, the FDRSB impairment level of approximately −30 dBc may be a noise floor that impacts the communication. There may be different FDRSB levels across different Tx RF chains due to a variety of reasons. For example, the FDRSB levels may be different because of variation due to process or temperature. As another example, the FDRSB levels may be different because some of the Tx chain may be based on IQ up-conversion and some other Tx chain may be based on intermediate frequency (IF), so some of the Tx chains may not suffer from FDRSB. As another example, the FDRSB levels may be different because Tx RF chain may be associated with different remote radio heads (RRH). In addition, the FDRSB levels may vary across different subcarriers. For example, the FDRSB levels may vary across different subcarriers (SCs) because in an asymmetric frequency allocation scenario around the center frequency, not all the SCs are interfered from the same FDRSB impairment. SCs that are allocated in frequency f, may have a FDRSB impairment if another subcarrier is allocated in mirror frequency −f. Aspects provided herein enables Tx power allocation based on FDRSB level information, such as FDRSB information for each Tx antenna associated with a particular RF chain and FDRSB information associated with different SCs. Such power allocation may result in more efficient wireless communication that may have a higher SNR and may support higher QAM.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service datan adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an AI interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as AI policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an adaptation component 198. In some aspects, the adaptation component 198 may be configured to receive, from a network node, at least one CSI RS. In some aspects, the adaptation component 198 may be further configured to transmit, to the network node, information indicative of at least one power associated with a post-processing frequency domain residual sideband and a noise per each antenna associated with the UE in a CSF report based on the at least one CSI RS. In some aspects, the adaptation component 198 may be further configured to receive, from the network node, a power allocation configuration based on the information indicative of the at least one power associated with the post-processing frequency domain residual sideband and the noise per each antenna associated with the network node.

In certain aspects, the base station 102 may include an adaptation component 199. In some aspects, the adaptation component 199 may be configured to transmit, for a UE, at least one CSI RS. In some aspects, the adaptation component 199 may be further configured to receive information indicative of at least one power associated with a post-processing frequency domain residual sideband and a noise per each antenna associated with the UE in a CSF report based on the at least one CSI RS. In some aspects, the adaptation component 199 may be further configured to transmit, for the UE, a power allocation configuration based on the information indicative of the at least one power associated with the post-processing frequency domain residual sideband and the noise per each antenna associated with the network node.

Although the following description may be focused on 5G NR, the concepts described herein may be applicable to other similar areas, such as LTE, LTE-A, CDMA, GSM, and other wireless technologies.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2:
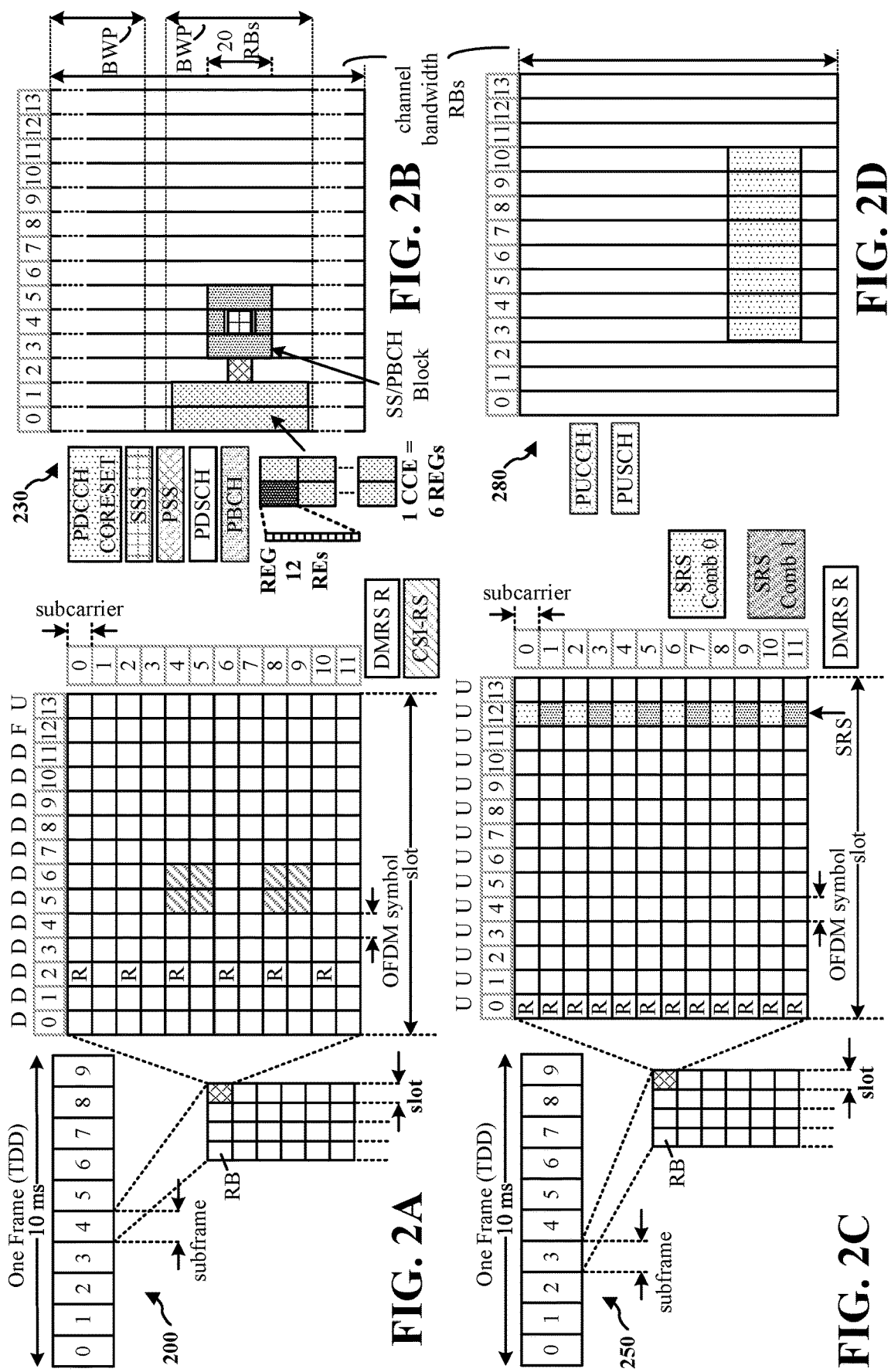
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
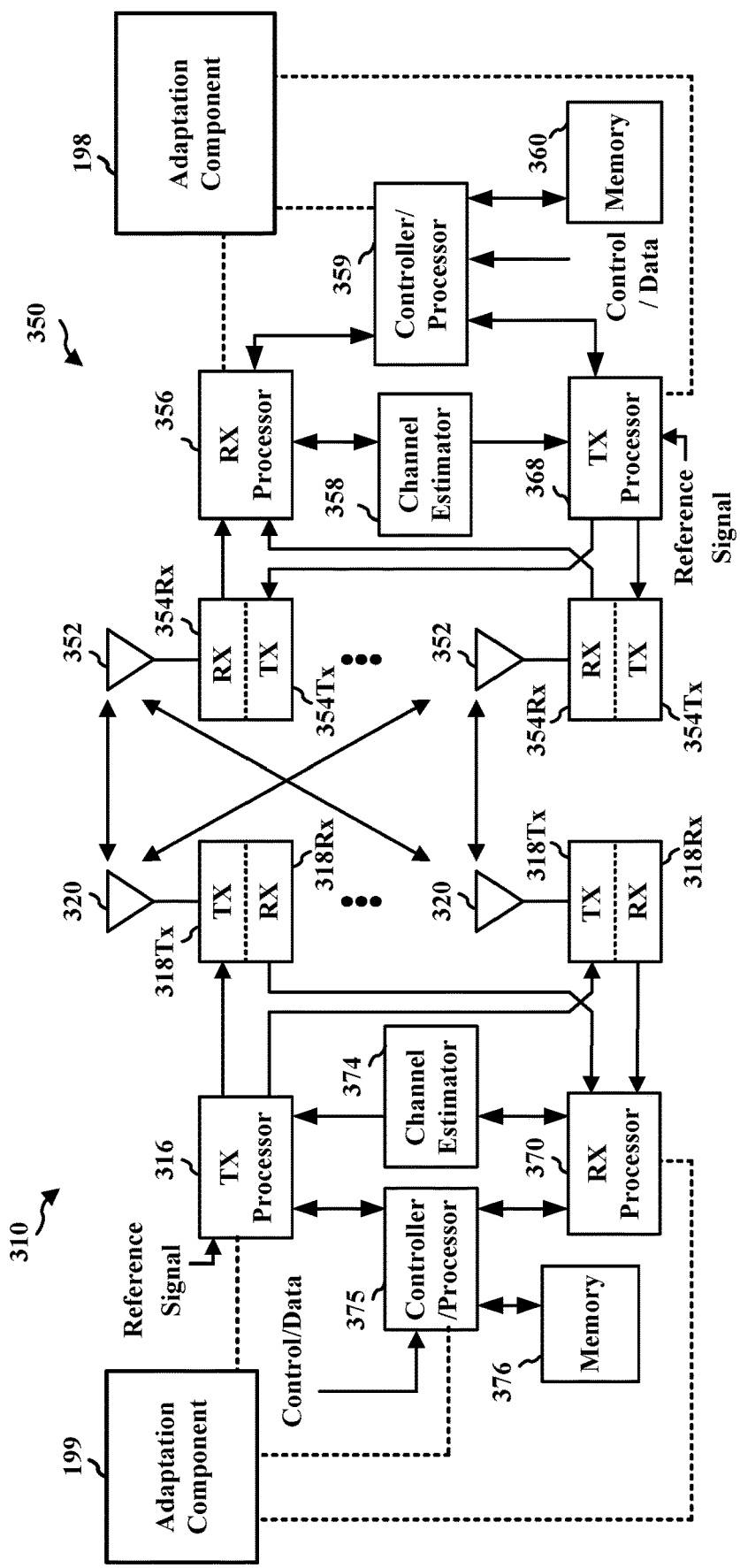
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service datan adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with adaptation component 198 of FIG. 1.

At least one of the TX processor 316, the RX processor 370, and the controller/processor 375 may be configured to perform aspects in connection with adaptation component 199 of FIG. 1.

A FDRSB may be caused by a Tx in-phase quadrature (IQ) mismatch, which may be an RF impairment that may affect data transmission rate. A residual sideband is generally a signal self-image caused by an IQ imbalance of the mismatched, imperfect mixer. The residual sideband may be a signal having a smaller amplitude or a greater amplitude than the intended signal, appearing at the negative of the frequency of the intended signal. The FDRSB impairment becomes more impactful as the carrier frequency goes higher. For example, there may be more FDRSB impairment for sub-TeraHertz (THz) communications compared to millimeter wave communications, and there may be more FDRSB impairment for millimeter wave communications compared to communications based on lower frequency bands. In some wireless communication systems, the FDRSB impairment level may be calibrated for enabling transmission quadrature amplitude modulation (QAM) communications up to 256 QAM, which may be approximately −30 dBc (decibels relative to carrier, which is a power ratio of a signal to a carrier signal, expressed in decibels). For higher QAM modulations, such as 1K QAM, 4K QAM, or 16K QAM, the signal to noise ratio may be high, such as approximately 45 decibels (dB). For these higher QAM modulations, the FDRSB impairment level of approximately −30 dBc may be a noise floor that impacts the communication. There may be different FDRSB levels across different Tx RF chains due to a variety of reasons. For example, the FDRSB levels may be different because of variation due to process or temperature. As another example, the FDRSB levels may be different because some of the Tx chain may be based on IQ up-conversion and some other Tx chain may be based on intermediate frequency (IF), so some of the Tx chains may not suffer from FDRSB. As another example, the FDRSB levels may be different because Tx RF chain may be associated with different remote radio heads (RRH). In addition, the FDRSB levels may vary across different subcarriers. For example, the FDRSB levels may vary across different subcarriers (SCs) because in an asymmetric frequency allocation scenario around the center frequency, not all the SCs are interfered from the same FDRSB impairment. SCs that are allocated in frequency f, may have a FDRSB impairment if another subcarrier is allocated in mirror frequency −f. Aspects provided herein enables Tx power allocation based on FDRSB level information, such as FDRSB information for each Tx antenna associated with a particular RF chain and FDRSB information associated with different SCs. Such power allocation may result in more efficient wireless communication that may have a higher SNR and may support higher QAM. As used herein, the term "power allocation configuration" may refer to a configuration configuring the Tx power used for different SCs and different Tx antenna. As used herein, the term "flatness group" (FNG) may refer to a set of one or more SCs (e.g., consecutive SCs) associated with (e.g., having) a FDRSB (e.g., post-processing FDRSB plus thermal noise level) within threshold(s) associated with that particular flatness group. For example, an entire frequency domain spectrum including a set of SCs supported by a UE may be divided into different FNGs which may each include a subset of SCs based on the respective threshold(s) of FDRSBs (e.g., post-processing FDRSB plus thermal noise level) associated with the different FNGs. As an example, the division of the FNGs may be determined by a UE or a network entity and may be communicated between the UE and the network entity upon establishing a connection, or other conditions. There may be multiple different FNGs associated with a same Tx antenna, and the FNGs associated with different Tx antennas may be different. For example, there may be a group of a FNG quantity of FNGs associated with a first antenna, and a second antenna may be associated with a different group of the same FNG quantity of FNGs. In some aspects, quantity of the subcarriers included within each FNG may vary across different FNGs. In some aspects, quantity of the subcarriers included within each FNG may be the same across different FNGs.

In a wireless communication system, an output of the modulator may be connected to rest of the transmission chain (which may also be referred to as "RF chain") up to the transmit antenna. As used herein, the term "transmission chain" may refer to an RF chain in a MIMO system. As used herein, the term "antenna" may refer to a Tx antenna associated with a particular Tx RF chain. An RF chain at a transmitter of a network entity (such as a base station) may be one or more modules or components that processes digital signal as an input and process the digital signal to an analog signal that may be ready for an antenna to transmit to another device. By way of example, an RF chain may take digital signal as an input, process the digital signal using a digital to analog converter, use a low pass filter to process an output of the digital to analog converter, perform frequency up-convert based on a local oscillator, amplify the signal using a power amplifier, filter the signal based on an band pass filter, and process the signal based on phase shifters. A network entity, such as a base station, may use a set of antennas connected to multiple IQ modulators or IF modulators and the set of antennas may come from different panels or different remote radio head (RRH) units associated with a same network entity. An RRH unit may be a remote radio transceiver that connects to an operator radio control panel via electrical or wireless interface. An RRH unit may be used for extending range of a network entity and different RRH units may be located in different physical locations while being considered part of a same network entity (e.g., a same gNB). Different panels or different RRH units may have different RF chain implementations. For example, RF chains at some panels or RRH units may be upconverting signals using IQ modulator and may experience IQ impairments (and may have unwanted energy in RSBs). RF chains at some panels or RRH units may be based on digital IF modulator (e.g., conversion) and may not experience IQ impairments.

In wireless communications, a sideband may refer to a band of frequencies that may be higher or lower than the carrier frequency (frequency of the carrier wave that is modulated to carry information). An RSB may be a signal self-image caused by an IQ imbalance of a mismatched, imperfect IQ mixer and may be unwanted. Mitigation techniques may be accordingly performed for the RSB. A mixer may be a module that mixes or combines two or more signals into a composite, combined, or mixed signal. Mixers may be adders or multipliers, or may implement other mathematical relationships between the mixer's input and output. The RSB may be due to gain mismatch and phase mismatch between IQ channels of the transceiver. An IQ modulator may include an IQ mixer. As used herein, the term "IQ modulator" may refer to a component or a module that converts information into RF signals by modulating both I and Q inputs. An IF may refer to a frequency in which a carrier wave is shifted as an intermediate step in transmission or reception. The IF may be created by mixing the carrier wave with a local oscillator (a module with a mixer to change the frequency of a signal). An IF modulator (which may otherwise be referred to as an IF converter) may modulate (or convert) IQ carrier waves from one frequency to an IF. An IF modulator may be used for various reasons such as shifting incoming signals to the IF before detection and decoding is done. At very high frequencies, signaling processing such as demodulation and decoding performance may be poor due to transistors being unable to deliver much gain. Capacitors and inductors for high frequencies may be replaced with more complex waveguides or striplines. Therefore, using an IF modulator to convert a signal to an IF may be beneficial and save costly signal processing in some instances. Some IF modulator may be based on digital IF conversion that converts digital signals (instead of analog signals) into a different frequency. Unlike IQ modulators, a digital IF modulator that changes frequency of digital signal to an IF may experience no IQ impairment and may not have unwanted energy in the RSBs. As an example, mitigation techniques for RSBs may not be used for digital IF modulator. Different panels or different RRH units may have different RF chain implementations. For example, RF chains at some panels or RRH units may be upconverting signals using IQ modulator and may experience IQ impairments (and may have unwanted energy in RSBs). RF chains at some panels or RRH units may be based on digital IF modulator (e.g., conversion) and may not experience IQ impairments. Therefore, RSB mitigations may be helpful for some panels or RRH units that may be upconverting signals using IQ modulator and RSB mitigations and may not be helpful for some panels or RRH units that may be based on digital IF modulator (e.g., conversion).

In a signal to noise spectrum of an asymmetric allocation with the presence of FDRSB, there may be regions (e.g., frequency regions) where the FDRSB may not be interfering. The SNR in these regions may be high and higher modulation and coding scheme (MCS) may be used in these regions. There may also be regions (e.g., frequency regions) where the FDRSB may be interfering. The SNR in these regions may be relatively low and higher modulation and coding scheme (MCS) may not be used in these regions. A signal to FDRSB plus thermal noise ratio (SNFR) may be varying across different SCs and different Tx antenna due to the allocation asymmetry level around the carrier frequency. To improve communication efficiency, an adjustment to Tx power allocation may be performed at the Tx network node. The allocated power level may be adjusted such that the signal power plus the FDRSB plus thermal noise level may be the same across all four antennas. In some aspects, such an adjustment may be referred to as a "water filling" type of adjustment. The Tx network node may be allocating more power as the noise floor is lower so that the sum of the FDRSB plus noise and signal may be similar across all of the Tx antennas (e.g., and SCs). Aspects provided herein may enable water filling of Tx power allocation by enabling reporting mechanism of FDRSB information. As used herein, the term "thermal noise" may refer to noises that does not correspond to FDRSB.

Figure 4:
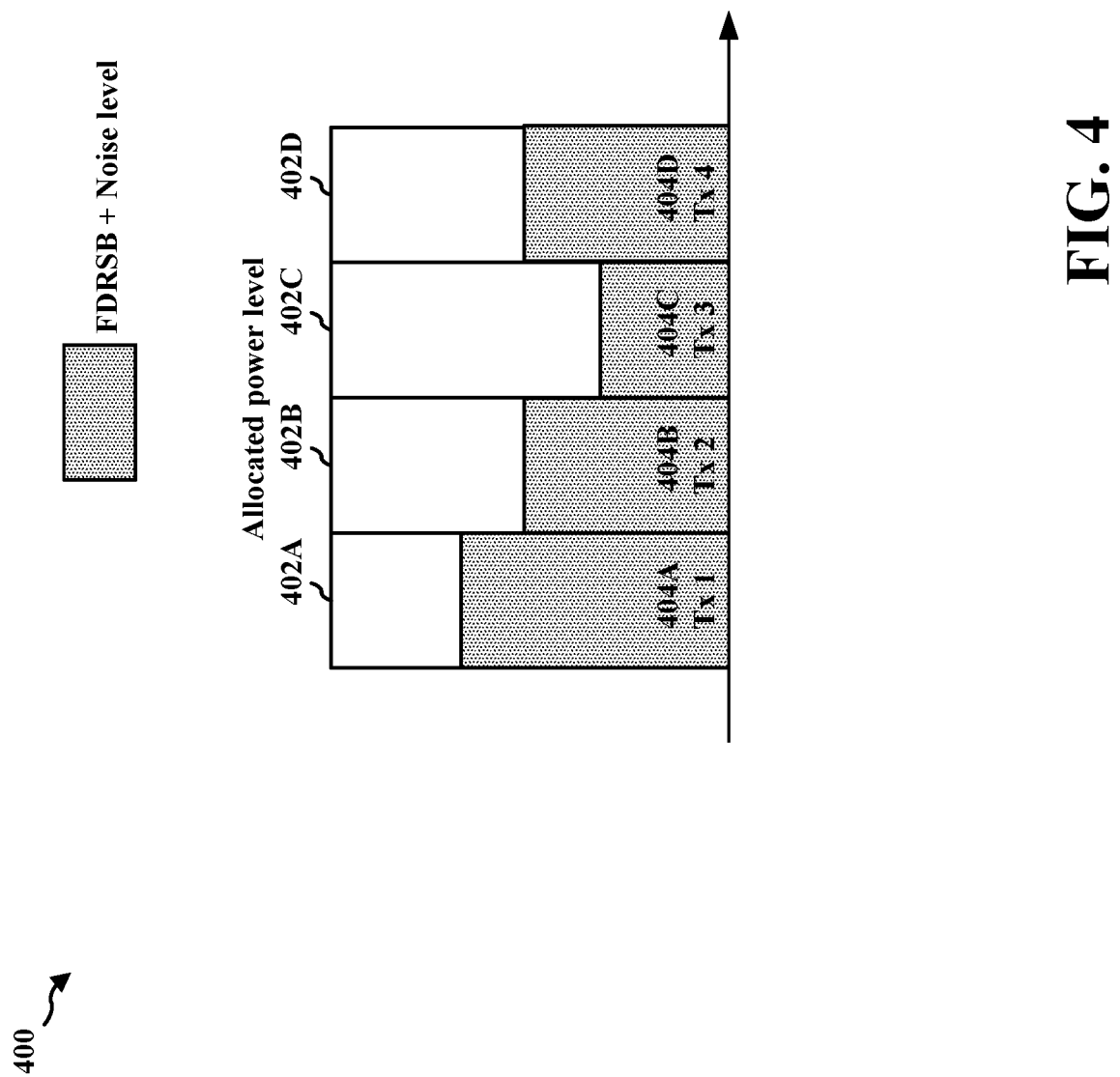
FIG. 4 is a diagram illustrating example water filling of transmit (Tx) power allocation based on frequency domain residual sideband (FDRSB), in accordance with various aspects of the present disclosure.

FIG. 4 is a diagram 400 illustrating example water filling of Tx power allocation based on FDRSB. As illustrated in FIG. 4, a first FDRSB plus thermal noise level 404A for a first Tx antenna, a second FDRSB plus thermal noise level 404B for a second Tx antenna, a third FDRSB plus thermal noise level 404C for a third Tx antenna, and a fourth FDRSB plus thermal noise level 404D for a fourth Tx antenna may all be different. Based on the Tx power allocation, the allocated power level may adjusted such that the signal power plus the FDRSB plus thermal noise level may be the same across all four antennas. For example, a first signal power plus the FDRSB plus thermal noise level 402A for the first antenna may be equal to a second signal power plus the FDRSB plus thermal noise level 402B for the second antenna, a third signal power plus the FDRSB plus thermal noise level 402C for the third antenna, and a fourth signal power plus the FDRSB plus thermal noise level 402D for the fourth antenna.

Figure 5:
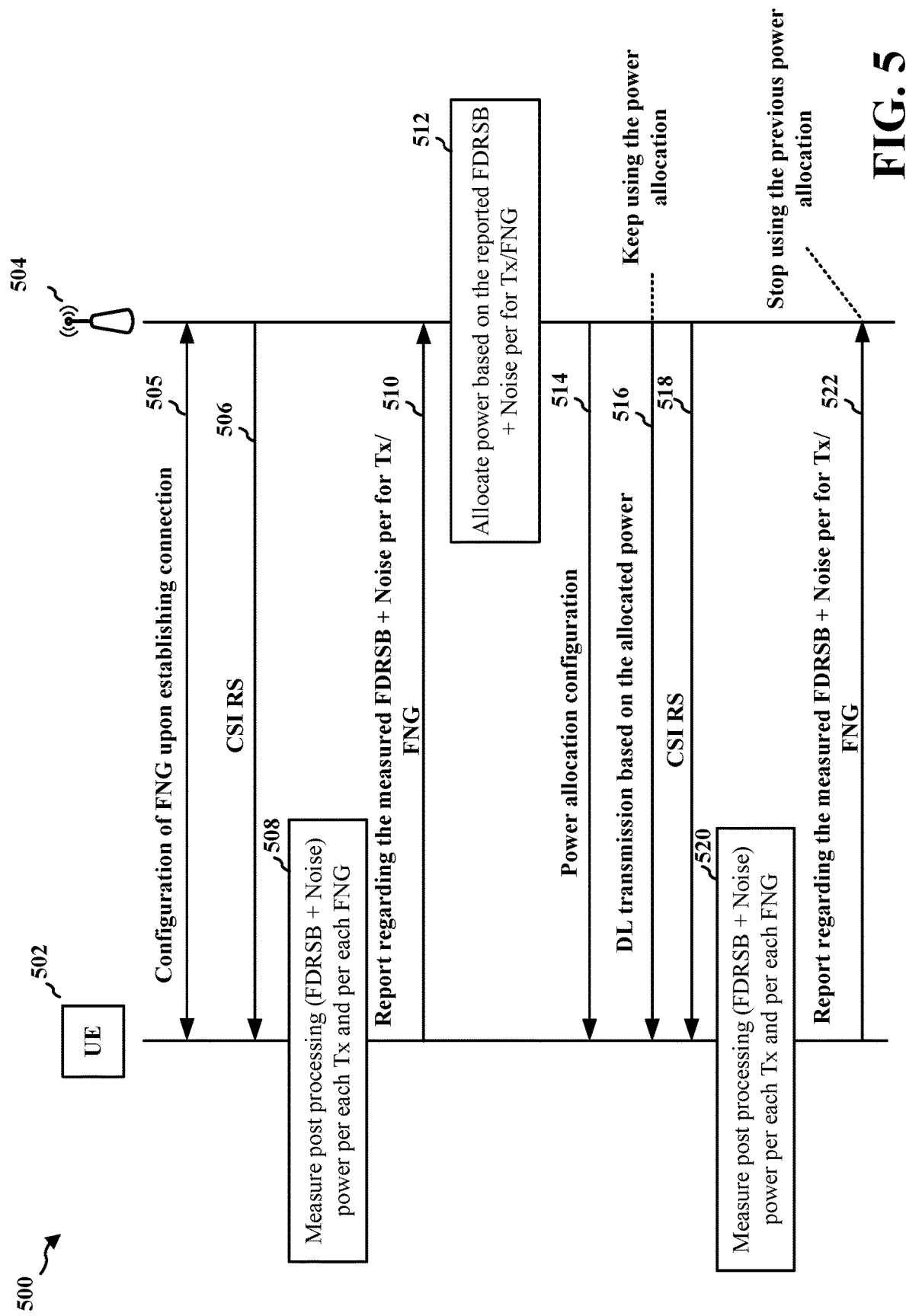
FIG. 5 is a diagram illustrating example communications between a network node and a UE, in accordance with various aspects of the present disclosure.

FIG. 5 is a diagram 500 illustrating example communications between a network node and a UE. As illustrated in FIG. 5, the network node 504 and the UE 502 may establish a connection. In some aspects, upon establishing the connection, a configuration 505 of FNG may be communicated between the UE 502 and the network node 504. In some aspects, the configuration 505 of FNG may be a configuration that partitions SCs of an entire frequency spectrum supported by the UE 502 into different FNGs. In some aspects, the configuration 505 of FNG may be determined by the UE 502 and transmitted from the UE 502 to the network node 504. In some aspects, the configuration 505 of FNG may be determined by the network node 504 and transmitted from the network node 504 to the UE 502.

In some aspects, the network node 504 may transmit CSI RS 506 to the UE 502. In some aspects, because the FDRSB is a RF impairment that occurs at the Tx, each pilot of the CSI RS 506 may correspond to a respective Tx antenna (e.g., the CSI RS 506 may be non-precoded). In some aspects, the CSI RS may be transmitted periodically to the UE 502 based on a rate that the FDRSB may be changing.

In some aspects, based on the received CSI RS 506, at 508, the UE 502 may estimate (e.g., measure) FDRSB plus thermal noise level per each FNG and each Tx antenna. As part of 508, the UE 502 may perform a channel estimation first. Then the UE 502 may estimate the observed FDRSB level, by using the estimated channel and the CSI-RS pilots in the CSI RS 506 known to the UE 502. In some aspects, because the channel estimation may be slightly affected from the IQ impairment, the UE 502 may iteratively perform the channel estimation and the FDRSB level estimation. For example, the UE 502 may first perform a first channel estimation, estimate the FDRSB level based on the first channel estimation, then perform a second channel estimation based on the estimated FDRSB level.

In some aspects, after estimating the FDRSB plus thermal noise level per each FNG and each Tx antenna at 508, the UE 502 may report information indicative of the estimated FDRSB plus thermal noise level per each FNG and each Tx antenna at 510. In some aspects, the UE 502 may report information indicative of the estimated FDRSB plus thermal noise level per each FNG and each Tx antenna at 510 based on a channel state feedback (CSF) report, a CSI report, or a different report. Table 2 below shows example information regarding FDRSB plus thermal noise level per each FNG and each Tx antenna where there are four FNGs with 40 SCs included in each FNG, and four total Tx antennas:

TABLE 2

Example FDRSB plus thermal noise level information

|  | 1$^{st}$ FNG (SCs 1-40) | 2$^{nd}$ FNG SCs(41-80) | 3$^{rd}$ FNG (SCs 81-120) | 4$^{th}$ (SCs 121-160) |
|---|---|---|---|---|
| Tx antenna 1 | −35[dBc] | −50[dBc] | −33[dBc] | −31[dBc] |
| Tx antenna 2 | −50[dBc] | −45[dBc] | −34[dBc] | −37[dBc] |
| Tx antenna 3 | −32[dBc] | −32[dBc] | −49[dBc] | −44[dBc] |
| Tx antenna 4 | −40[dBc] | −30[dBc] | −42[dBc] | −50[dBc] |

Such a table may be included in the CSF report, the CSI report, or a different report. In some aspects, a FNG size may depend on the flatness of the FDRSB (e.g., it may correspond to the number of SCs that the FDRSB remains flat). In some aspects, instead of determining the configuration of FNG at 505, the configuration of FNG may be determined at a different time.

In some aspects, based on the information indicative of the estimated FDRSB plus thermal noise level per each FNG and each Tx antenna received at 510, the network node 504 may, at 512, allocate Tx power for each Tx antenna and each FNG based on the reported FDRSB plus thermal noise level per each FNG and each Tx antenna. For example, network node 504 may, at 512, allocate Tx power for each Tx antenna and each FNG based on the reported FDRSB plus thermal noise level per each FNG and each Tx antenna based on the water filling power allocation described in connection with FIG. 4. In some aspects, the network node 504 may transmit a power allocation configuration 514 to the UE 502 to indicate the power allocation determined at 512. In some aspects, the network node 504 may transmit a DL transmission 516 based on the power allocation configuration 514. In some aspects, the network node 504 may keep using the power allocation determined at 512 until a second report regarding FDRSB plus thermal noise level per each FNG and each Tx antenna is received at 522. In some aspects, a second CSI RS 518, which may be a second periodic CSI RS after the CSI RS 506, may be transmitted from the network node 504 to the UE 502. The UE 502 may estimate FDRSB plus thermal noise level per each FNG and each Tx antenna based on the second CSI RS 518 at 520, and may report the estimated FDRSB plus thermal noise level per each FNG and each Tx antenna at 522. Although not illustrated, the network may provide additional downlink transmissions with an allocated power based on the report at 522, similar to the DL transmission at 516.

Figure 6:
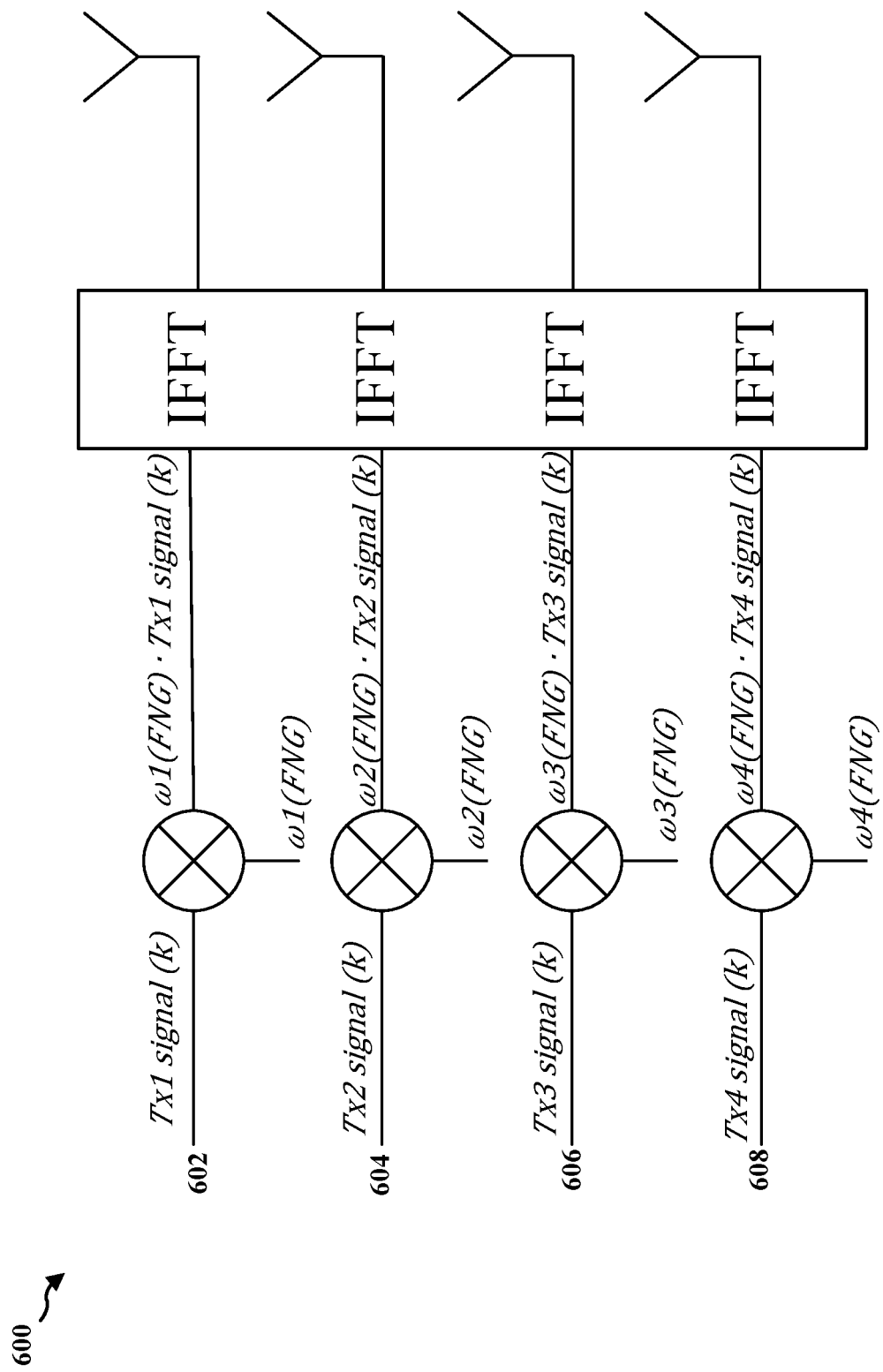
FIG. 6 is a diagram illustrating example transmission at different antennas of a network node, in accordance with various aspects of the present disclosure.

FIG. 6 is a diagram 600 illustrating example transmission at different antennas of a network node, in accordance with various aspects of the present disclosure. Based on the reported FDRSB plus thermal noise level, the network node may allocate the power for the next slot. For each FNG, the network node may weigh the Tx signals power according to the water filling technique described in connection with FIG. 4. As illustrated in FIG. 6, a first RF chain 602, a second RF chain 604, a third RF chain 606, and a fourth RF chain 608 may be included. In some aspects, as illustrated in FIG. 6, the weighting may be based on $\omega_n$(FNG), n=1, 2, 3, or 4 applied to the to be transmitted signal Tx$_n$ signal(k), n=1, 2, 3, or 4 and may be applied before inverse fast Fourier transform (IFFT). In some aspects, based on that each Tx signal power is P before weighting, to preserve total transmit power, the weights may be based on $\Sigma_{i=1}^{NTx}(\omega_i)2 P=NTx\cdot P=>\Sigma_{i=1}^{NTx}(\omega_i)2=1$, where $N_{Tx}$ is the number of Tx antennas (equal to 4 in FIG. 6). Such an allocation may be performed for each of the next slots at Tx (e.g., for DL transmission by the network node 504), until a next report regarding FDRSB plus thermal noise level arrives.

Figure 7:
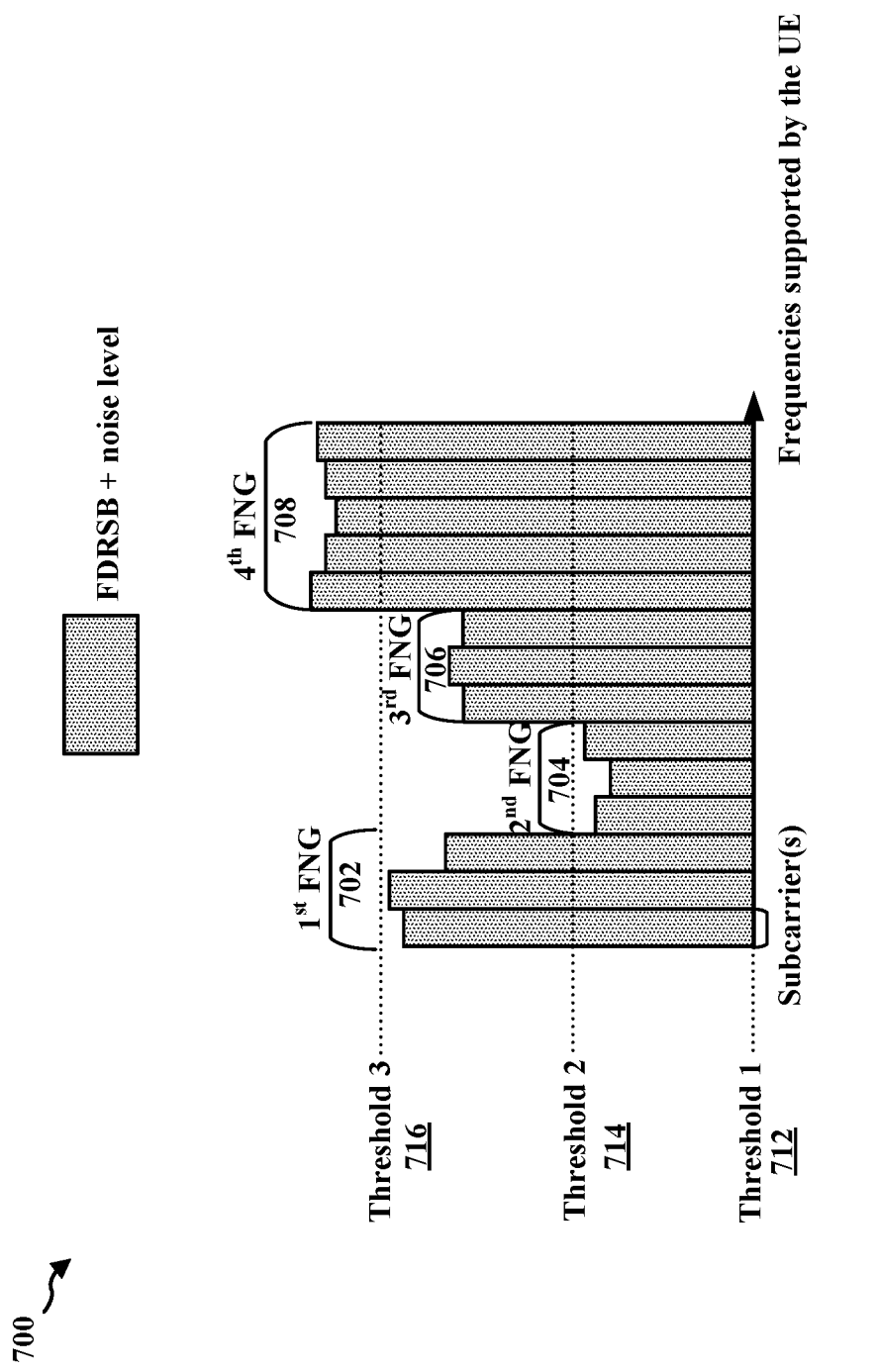
FIG. 7 is a diagram illustrating example flatness groups (FNGs) associated with a UE, in accordance with various aspects of the present disclosure.

FIG. 7 is a diagram 700 illustrating example FNGs associated with a UE and a particular Tx antenna. As illustrated in FIG. 7, a first FNG 702 may include a first subset of SCs where the associated FDRSB plus noise level is within a second threshold 714 and a third threshold 716. A second FNG 704 may include a second subset of SCs where the associated FDRSB plus noise level is within a first threshold 712 and the second threshold 714. A third FNG 706 may include a third subset of SCs where the associated FDRSB plus noise level is within the second threshold 714 and the third threshold 716. A fourth FNG 708 may include a fourth subset of SCs where the associated FDRSB plus noise level is above the third threshold 716. In some aspects, the combination of the first FNG 702, the second FNG 704, the third FNG 706, and the fourth FNG 708 may span all frequencies supported by the UE 502. In some aspects, the combination of the first FNG 702, the second FNG 704, the third FNG 706, and the fourth FNG 708 may span a subset of frequencies supported by the UE 502, such as a subset of frequencies that may be used for communication between the UE 502 and the network node 504.

Figure 8:
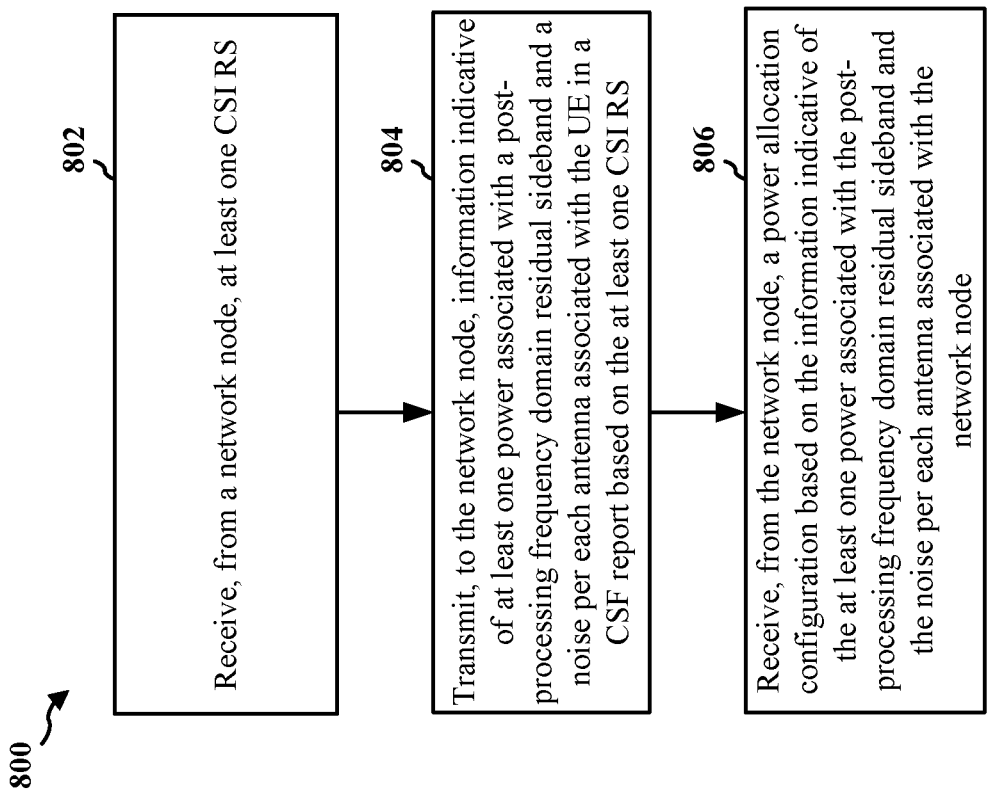
FIG. 8 is a flowchart of a method of wireless communication, in accordance with various aspects of the present disclosure.

FIG. 8 is a flowchart 800 of a method of wireless communication. The method may be performed by a UE (e.g., the UE 104; the apparatus 1004). The method may improve downlink transmission by enabling a network node to allocate transmit power per each Tx antenna and each FNG based on information regarding FDRSB and noise.

At 802, the UE may receive, from a network node, at least one CSI RS. For example, the UE 502 may receive, from a network node 504, at least one CSI RS (e.g., 506). In some aspects, 802 may be performed by adaptation component 198.

At 804, the UE may transmit, to the network node, information indicative of at least one power associated with a post-processing frequency domain residual sideband and a noise per each antenna associated with the UE in a CSF report based on the at least one CSI RS. For example, the UE 502 may transmit, to the network node 504, information (e.g., 510) indicative of at least one power associated with a post-processing frequency domain residual sideband and a noise per each antenna associated with the UE in a CSF report based on the at least one CSI RS. In some aspects, 804 may be performed by adaptation component 198. In some aspects, the at least one CSI RS includes a set of CSI RSs, and where each CSI RS in the set of CSI RSs respectively correspond to one particular antenna associated with the network node. In some aspects, the at least one power includes a set of powers, where each power in the set of powers correspond to a respective flatness group in a set of flatness groups associated with the UE, where the set of flatness groups span a frequency spectrum associated with the UE, and where each flatness group in the set of flatness groups is associated with a respective subset of subcarriers associated with the frequency spectrum where the post-processing frequency domain residual sideband is within a respective threshold. In some aspects, the UE may receive, from the network node upon establishing a connection with the network node, a configuration (e.g., 505) of the set of flatness groups. In some aspects, the UE may receive, from the network node, a configuration (e.g., 505) of the set of flatness groups, where the configuration of the set of flatness groups is uniquely associated with the network node and the UE. In some aspects, the UE may determine, for each flatness group in the set of flatness groups, the respective subset of subcarriers associated with the frequency spectrum where the post-processing frequency domain residual sideband is within the respective threshold and determine a configuration of the set of flatness groups. In some aspects, the UE may transmit, to the network node, the configuration (e.g., 505) of the set of flatness groups upon establishing a connection with the network node. In some aspects, the UE may transmit, to the network node, the configuration (e.g., 505) of the set of flatness groups, where the configuration of the set of flatness groups is uniquely associated with the network node and the UE. In some aspects, the power allocation configuration is configured to allocate at least one transmit power for at least one subsequent slot based on the at least one power. In some aspects, the at least one subsequent slot includes a quantity of slots before a next CSF report with additional information indicative of at least one second power associated with the post-processing frequency domain residual sideband and the noise per each antenna. In some aspects, the UE may iteratively perform a channel estimation and estimate the post-processing frequency domain residual sideband based on the channel estimation and the at least one CSI RS.

At 806, the UE may receive, from the network node, a power allocation configuration based on the information indicative of the at least one power associated with the post-processing frequency domain residual sideband and the noise per each antenna associated with the network node. For example, the UE 502 may receive, from the network node 504, a power allocation configuration (e.g., 514) based on the information indicative of the at least one power associated with the post-processing frequency domain residual sideband and the noise per each antenna associated with the network node. In some aspects, 806 may be performed by adaptation component 198. In some aspects, the UE may receive, from the network node, a DL transmission (e.g. 516) based on the power allocation configuration.

Figure 9:
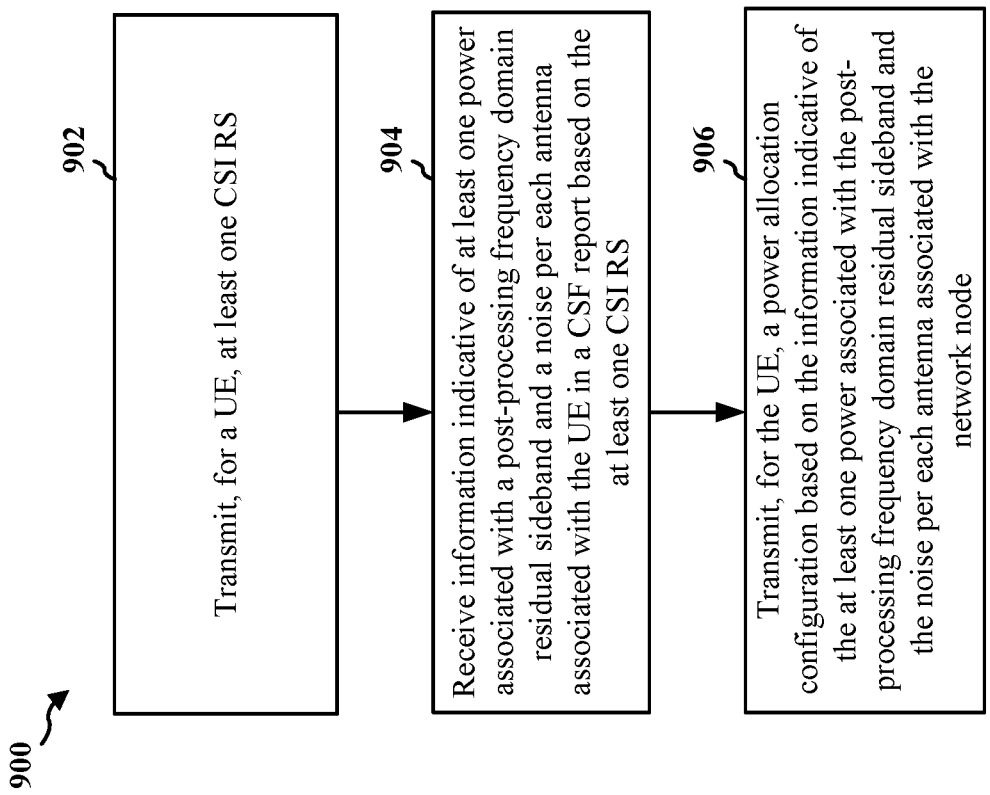
FIG. 9 is a flowchart of a method of wireless communication, in accordance with various aspects of the present disclosure.

FIG. 9 is a flowchart 900 of a method of wireless communication. The method may be performed by a network node (e.g., the base station 102, the network node 504, the network entity 1002, the network entity 1102). The method may improve downlink transmission by enabling a network node to allocate transmit power per each Tx antenna and each FNG based on information regarding FDRSB and noise.

At 902, the network node may transmit, for a UE, at least one CSI RS. For example, the network node 504 may transmit, for a UE 502, at least one CSI RS (e.g., 506). In some aspects, 902 may be performed by adaptation component 199. In some aspects, the at least one CSI RS includes a set of CSI RSs, and where each CSI RS in the set of CSI RSs respectively correspond to one particular antenna associated with the network node.

At 904, the network node may receive information indicative of at least one power associated with a post-processing frequency domain residual sideband and a noise per each antenna associated with the UE in a CSF report based on the at least one CSI RS. For example, the network node 504 may receive information (e.g., 510) indicative of at least one power associated with a post-processing frequency domain residual sideband and a noise per each antenna associated with the UE in a CSF report based on the at least one CSI RS. In some aspects, 904 may be performed by adaptation component 199. In some aspects, the at least one power includes a set of powers, where each power in the set of powers correspond to a respective flatness group in a set of flatness groups associated with the UE, where the set of flatness groups span a frequency spectrum associated with the UE, and where each flatness group in the set of flatness groups is associated with a respective subset of subcarriers associated with the frequency spectrum where the post-processing frequency domain residual sideband is within a respective threshold. In some aspects, the network node may determine, for each flatness group in the set of flatness groups, the respective subset of subcarriers associated with the frequency spectrum where the post-processing frequency domain residual sideband is within the respective threshold and determine a configuration of the set of flatness groups. In some aspects, the network node may transmit, for the UE upon establishing a connection with the UE, the configuration (e.g., 505) of the set of flatness groups. In some aspects, transmit, for the UE, the configuration of the set of flatness groups, where the configuration of the set of flatness groups is uniquely associated with the network node and the UE. In some aspects, the network node may receive a configuration (e.g., 505) of the set of flatness groups upon establishing a connection with the UE. In some aspects, the network node may receive a configuration (e.g., 505) of the set of flatness groups, where the configuration of the set of flatness groups is uniquely associated with the network node and the UE.

At 906, the network node may transmit, for the UE, a power allocation configuration based on the information indicative of the at least one power associated with the post-processing frequency domain residual sideband and the noise per each antenna associated with the network node. For example, the network node 504 may transmit, for the UE 502, a power allocation configuration (e.g., 514) based on the information indicative of the at least one power associated with the post-processing frequency domain residual sideband and the noise per each antenna associated with the network node. In some aspects, 906 may be performed by adaptation component 199. In some aspects, the power allocation configuration is configured to allocate at least one transmit power for at least one subsequent slot based on the at least one power. In some aspects, the at least one subsequent slot includes a quantity of slots before a next CSF report with additional information indicative of at least one second power associated with the post-processing frequency domain residual sideband and the noise per each antenna. In some aspects, the network node may transmit, for the UE, a DL transmission (e.g. 516) based on the power allocation configuration.

Figure 10:
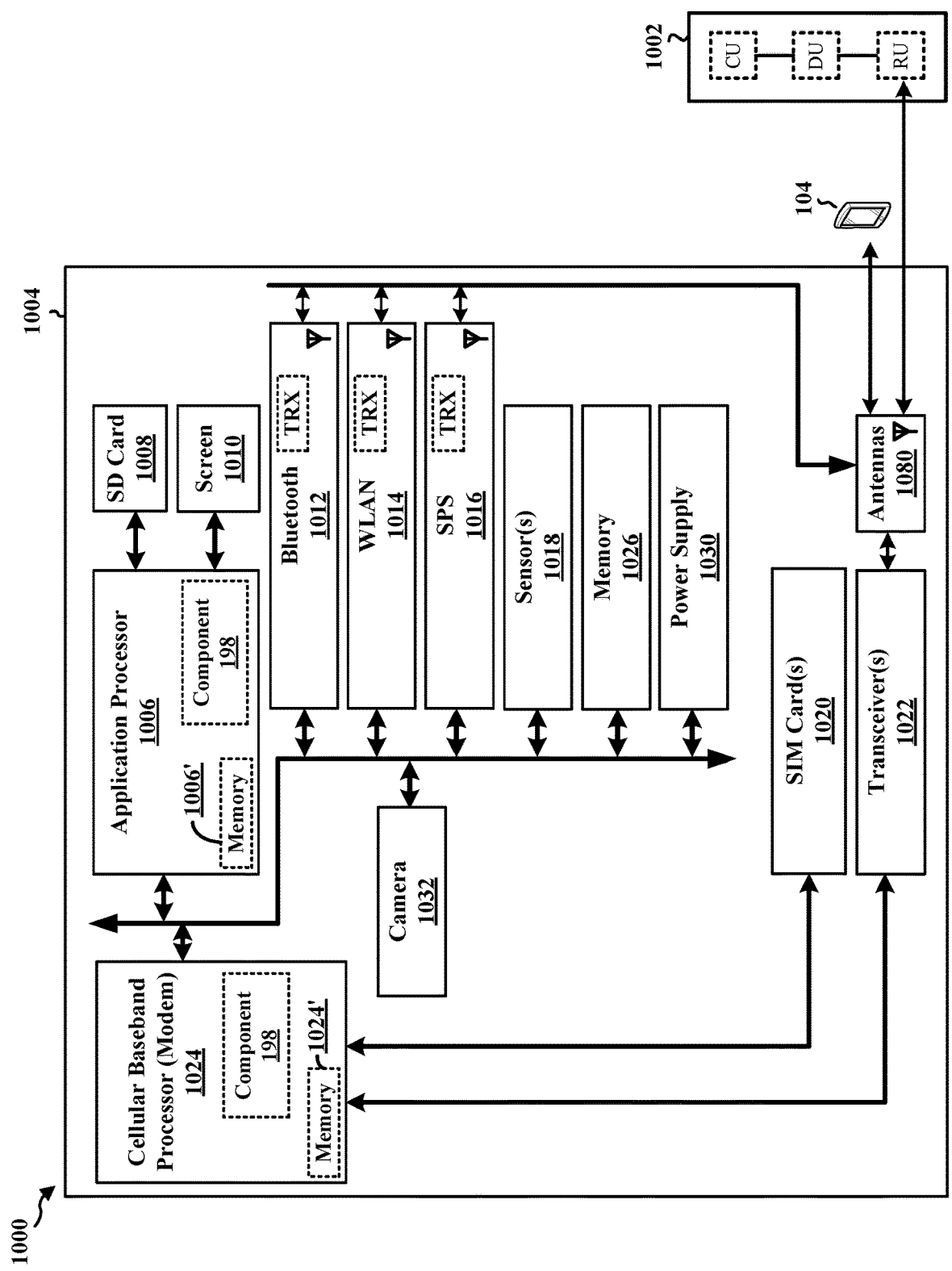
FIG. 10 is a diagram illustrating an example of a hardware implementation for an example apparatus and/or network entity, in accordance with various aspects of the present disclosure.

FIG. 10 is a diagram 1000 illustrating an example of a hardware implementation for an apparatus 1004. The apparatus 1004 may be a UE, a component of a UE, or may implement UE functionality. In some aspects, the apparatus 1004 may include at least one cellular baseband processor 1024 (also referred to as a modem) coupled to one or more transceivers 1022 (e.g., cellular RF transceiver). The cellular baseband processor(s) 1024 may include at least one on-chip memory 1024'. In some aspects, the apparatus 1004 may further include one or more subscriber identity modules (SIM) cards 1020 and at least one application processor 1006 coupled to a secure digital (SD) card 1008 and a screen 1010. The application processor(s) 1006 may include on-chip memory 1006'. In some aspects, the apparatus 1004 may further include a Bluetooth module 1012, a WLAN module 1014, an SPS module 1016 (e.g., GNSS module), one or more sensor modules 1018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1026, a power supply 1030, and/or a camera 1032. The Bluetooth module 1012, the WLAN module 1014, and the SPS module 1016 may include an on-chip transceiver (TRX) (or in some cases, just a receiver (RX)). The Bluetooth module 1012, the WLAN module 1014, and the SPS module 1016 may include their own dedicated antennas and/or utilize the antennas 1080 for communication. The cellular baseband processor(s) 1024 communicates through the transceiver(s) 1022 via one or more antennas 1080 with the UE 104 and/or with an RU associated with a network entity 1002. The cellular baseband processor(s) 1024 and the application processor(s) 1006 may each include a computer-readable medium/memory 1024', 1006', respectively. The additional memory modules 1026 may also be considered a computer-readable medium/memory. Each computer-readable medium/memory 1024', 1006', 1026 may be non-transitory. The cellular baseband processor(s) 1024 and the application processor(s) 1006 are each responsible for general processing, including the execution of software stored on the computer-readable medium/memory. The software, when executed by the cellular baseband processor(s) 1024/application processor(s) 1006, causes the cellular baseband processor(s) 1024/application processor(s) 1006 to perform the various functions described supra. The computer-readable medium/memory may also be used for storing data that is manipulated by the cellular baseband processor(s) 1024/application processor(s) 1006 when executing software. The cellular baseband processor(s) 1024/application processor(s) 1006 may be a component of the UE 350 and may include the at least one memory 360 and/or at least one of the TX processor 368, the RX processor 356, and the controller/processor 359. In one configuration, the apparatus 1004 may be at least one processor chip (modem and/or application) and include just the cellular baseband processor(s) 1024 and/or the application processor(s) 1006, and in another configuration, the apparatus 1004 may be the entire UE (e.g., see UE 350 of FIG. 3) and include the additional modules of the apparatus 1004.

As discussed supra, the adaptation component 198 may be configured to receive, from a network node, at least one CSI RS. In some aspects, the adaptation component 198 may be further configured to transmit, to the network node, information indicative of at least one power associated with a post-processing frequency domain residual sideband and a noise per each antenna associated with the UE in a CSF report based on the at least one CSI RS. In some aspects, the adaptation component 198 may be further configured to receive, from the network node, a power allocation configuration based on the information indicative of the at least one power associated with the post-processing frequency domain residual sideband and the noise per each antenna associated with the network node. The adaptation component 198 may be within the cellular baseband processor(s) 1024, the application processor(s) 1006, or both the cellular baseband processor(s) 1024 and the application processor(s) 1006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1004 may include a variety of components configured for various functions. In one configuration, the apparatus 1004, and in particular the cellular baseband processor(s) 1024 and/or the application processor(s) 1006, may include means for receiving, from a network node, at least one CSI RS. In some aspects, the apparatus 1004 may include means for transmitting, to the network node, information indicative of at least one power associated with a post-processing frequency domain residual sideband and a noise per each antenna associated with the UE in a CSF report based on the at least one CSI RS. In some aspects, the apparatus 1004 may include means for receiving, from the network node, a power allocation configuration based on the information indicative of the at least one power associated with the post-processing frequency domain residual sideband and the noise per each antenna associated with the network node. In some aspects, the apparatus 1004 may include means for receiving, from the network node upon establishing a connection with the network node, a configuration of the set of flatness groups. In some aspects, the apparatus 1004 may include means for receiving, from the network node, a configuration of the set of flatness groups, where the configuration of the set of flatness groups is uniquely associated with the network node and the UE. In some aspects, the apparatus 1004 may include means for determining, for each flatness group in the set of flatness groups, the respective subset of subcarriers associated with the frequency spectrum where the post-processing frequency domain residual sideband is within the respective threshold. In some aspects, the apparatus 1004 may include means for determining a configuration of the set of flatness groups. In some aspects, the apparatus 1004 may include means for transmitting, to the network node, the configuration of the set of flatness groups upon establishing a connection with the network node. In some aspects, the apparatus 1004 may include means for transmitting, to the network node, the configuration of the set of flatness groups, where the configuration of the set of flatness groups is uniquely associated with the network node and the UE. In some aspects, the apparatus 1004 may include means for iteratively performing a channel estimation. In some aspects, the apparatus 1004 may include means for estimating the post-processing frequency domain residual sideband based on the channel estimation and the at least one CSI RS. The means may be the component 198 of the apparatus 1004 configured to perform the functions recited by the means. As described supra, the apparatus 1004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 11:
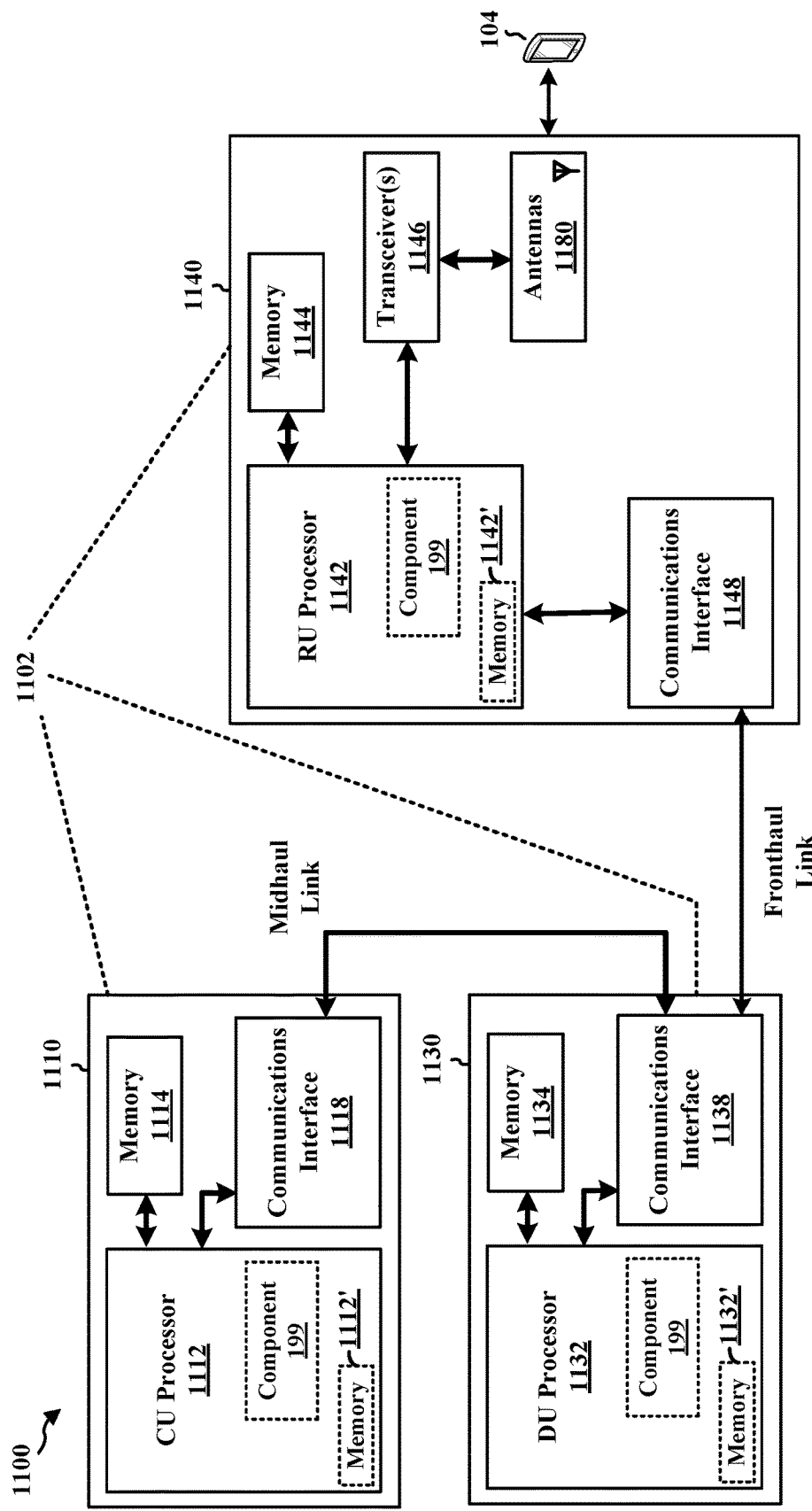
FIG. 11 is a diagram illustrating an example of a hardware implementation for an example network entity, in accordance with various aspects of the present disclosure.

FIG. 11 is a diagram 1100 illustrating an example of a hardware implementation for a network entity 1102. The network entity 1102 may be a BS, a component of a BS, or may implement BS functionality. The network entity 1102 may include at least one of a CU 1110, a DU 1130, or an RU 1140. For example, depending on the layer functionality handled by the component 199, the network entity 1102 may include the CU 1110; both the CU 1110 and the DU 1130; each of the CU 1110, the DU 1130, and the RU 1140; the DU 1130; both the DU 1130 and the RU 1140; or the RU 1140. The CU 1110 may include at least one CU processor 1112. The CU processor(s) 1112 may include on-chip memory 1112'. In some aspects, the CU 1110 may further include additional memory modules 1114 and a communications interface 1118. The CU 1110 communicates with the DU 1130 through a midhaul link, such as an F1 interface. The DU 1130 may include at least one DU processor 1132. The DU processor(s) 1132 may include on-chip memory 1132'. In some aspects, the DU 1130 may further include additional memory modules 1134 and a communications interface 1138. The DU 1130 communicates with the RU 1140 through a fronthaul link. The RU 1140 may include at least one RU processor 1142. The RU processor(s) 1142 may include on-chip memory 1142'. In some aspects, the RU 1140 may further include additional memory modules 1144, one or more transceivers 1146, antennas 1180, and a communications interface 1148. The RU 1140 communicates with the UE 104. The on-chip memory 1112', 1132', 1142' and the additional memory modules 1114, 1134, 1144 may each be considered a computer-readable medium/memory. Each computer-readable medium/memory may be non-transitory. Each of the processors 1112, 1132, 1142 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the adaptation component 199 may be configured to transmit, for a UE, at least one CSI RS. In some aspects, the adaptation component 199 may be further configured to receive information indicative of at least one power associated with a post-processing frequency domain residual sideband and a noise per each antenna associated with the UE in a CSF report based on the at least one CSI RS. In some aspects, the adaptation component 199 may be further configured to transmit, for the UE, a power allocation configuration based on the information indicative of the at least one power associated with the post-processing frequency domain residual sideband and the noise per each antenna associated with the network node. The adaptation component 199 may be within one or more processors of one or more of the CU 1110, DU 1130, and the RU 1140. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1102 may include a variety of components configured for various functions. In one configuration, the network entity 1102 may include means for transmitting, for a UE, at least one CSI RS. In some aspects, the network entity 1102 may include means for receiving information indicative of at least one power associated with a post-processing frequency domain residual sideband and a noise per each antenna associated with the UE in a CSF report based on the at least one CSI RS. In some aspects, the network entity 1102 may include means for transmitting, for the UE, a power allocation configuration based on the information indicative of the at least one power associated with the post-processing frequency domain residual sideband and the noise per each antenna associated with the network node. In some aspects, the network entity 1102 may include means for determining, for each flatness group in the set of flatness groups, the respective subset of subcarriers associated with the frequency spectrum where the post-processing frequency domain residual sideband is within the respective threshold. In some aspects, the network entity 1102 may include means for determining a configuration of the set of flatness groups. In some aspects, the network entity 1102 may include means for transmitting, for the UE upon establishing a connection with the UE, the configuration of the set of flatness groups. In some aspects, the network entity 1102 may include means for transmitting, for the UE, the configuration of the set of flatness groups, where the configuration of the set of flatness groups is uniquely associated with the network node and the UE. In some aspects, the network entity 1102 may include means for receiving a configuration of the set of flatness groups upon establishing a connection with the UE. In some aspects, the network entity 1102 may include means for receiving a configuration of the set of flatness groups, where the configuration of the set of flatness groups is uniquely associated with the network node and the UE. The means may be the component 199 of the network entity 1102 configured to perform the functions recited by the means. As described supra, the network entity 1102 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method for wireless communication performed by a UE, including: receiving, from a network node, at least one CSI RS; transmitting, to the network node, information indicative of at least one power associated with a post-processing frequency domain residual sideband and a noise per each antenna associated with the UE in a CSF report based on the at least one CSI RS; and receiving, from the network node, a power allocation configuration based on the information indicative of the at least one power associated with the post-processing frequency domain residual sideband and the noise per each antenna associated with the network node.

Aspect 2 is the method of aspect 1, where the at least one CSI RS includes a set of CSI RSs, and where each CSI RS in the set of CSI RSs respectively correspond to one particular antenna associated with the network node.

Aspect 3 is the method of any of aspects 1-2, where the at least one power includes a set of powers, where each power in the set of powers correspond to a respective flatness group in a set of flatness groups associated with the UE, where the set of flatness groups span a frequency spectrum associated with the UE, and where each flatness group in the set of flatness groups is associated with a respective subset of subcarriers associated with the frequency spectrum where the post-processing frequency domain residual sideband is within a respective threshold.

Aspect 4 is the method of aspect 3, further including: receiving, from the network node upon establishing a connection with the network node, a configuration of the set of flatness groups.

Aspect 5 is the method of any of aspects 3-4, further including: receiving, from the network node, a configuration of the set of flatness groups, where the configuration of the set of flatness groups is uniquely associated with the network node and the UE.

Aspect 6 is the method of aspect 3, further including: determining, for each flatness group in the set of flatness groups, the respective subset of subcarriers associated with the frequency spectrum where the post-processing frequency domain residual sideband is within the respective threshold; and determining a configuration of the set of flatness groups.

Aspect 7 is the method of aspect 6, further including: transmitting, to the network node, the configuration of the set of flatness groups upon establishing a connection with the network node.

Aspect 8 is the method of any of aspects 6-7, further including: transmitting, to the network node, the configuration of the set of flatness groups, where the configuration of the set of flatness groups is uniquely associated with the network node and the UE.

Aspect 9 is the method of any of aspects 1-8, where the power allocation configuration is configured to allocate at least one transmit power for at least one subsequent slot based on the at least one power.

Aspect 10 is the method of aspect 9, where the at least one subsequent slot includes a quantity of slots before a next CSF report with additional information indicative of at least one second power associated with the post-processing frequency domain residual sideband and the noise per each antenna.

Aspect 11 is the method of any of aspects 1-10, further including: iteratively performing a channel estimation; estimating the post-processing frequency domain residual sideband based on the channel estimation and the at least one CSI RS.

Aspect 12 is an method for wireless communication performed by a network node, including: transmitting, for a UE, at least one CSI RS; receiving information indicative of at least one power associated with a post-processing frequency domain residual sideband and a noise per each antenna associated with the UE in a CSF report based on the at least one CSI RS; and transmitting, for the UE, a power allocation configuration based on the information indicative of the at least one power associated with the post-processing frequency domain residual sideband and the noise per each antenna associated with the network node.

Aspect 13 is the method of aspect 12, where the at least one CSI RS includes a set of CSI RSs, and where each CSI RS in the set of CSI RSs respectively correspond to one particular antenna associated with the network node.

Aspect 14 is the method of any of aspects 12-13, where the at least one power includes a set of powers, where each power in the set of powers correspond to a respective flatness group in a set of flatness groups associated with the UE, where the set of flatness groups span a frequency spectrum associated with the UE, and where each flatness group in the set of flatness groups is associated with a respective subset of subcarriers associated with the frequency spectrum where the post-processing frequency domain residual sideband is within a respective threshold.

Aspect 15 is the method of aspect 14, further including: determining, for each flatness group in the set of flatness groups, the respective subset of subcarriers associated with the frequency spectrum where the post-processing frequency domain residual sideband is within the respective threshold; and determining a configuration of the set of flatness groups.

Aspect 16 is the method of aspect 15, further including: transmitting, for the UE upon establishing a connection with the UE, the configuration of the set of flatness groups.

Aspect 17 is the method of any of aspects 15-16, further including: transmitting, for the UE, the configuration of the set of flatness groups, where the configuration of the set of flatness groups is uniquely associated with the network node and the UE.

Aspect 18 is the method of aspect 14, further including: receiving a configuration of the set of flatness groups upon establishing a connection with the UE.

Aspect 19 is the method of any of aspects 14 or 18, further including: receiving a configuration of the set of flatness groups, where the configuration of the set of flatness groups is uniquely associated with the network node and the UE.

Aspect 20 is the method of any of aspects 12-19, where the power allocation configuration is configured to allocate at least one transmit power for at least one subsequent slot based on the at least one power.

Aspect 21 is the method of aspect 20, where the at least one subsequent slot includes a quantity of slots before a next CSF report with additional information indicative of at least one second power associated with the post-processing frequency domain residual sideband and the noise per each antenna.

Aspect 22 is an apparatus for wireless communication at a device (e.g., a UE) including at least one memory and at least one processor coupled to the at least one memory and, based at least in part on information stored in the at least one memory, the at least one processor is configured, individually or in combination, to cause the device to implement any of aspects 1 to 11.

Aspect 23 is an apparatus for wireless communication at a device (e.g., a UE) including at least one memory and at least one processor coupled to the at least one memory and configured, individually or in combination, to cause the device to implement any of aspects 1 to 11.

Aspect 24 is the apparatus of aspect 22 or 23, further including one or more transceivers or one or more antennas coupled to the at least one processor.

Aspect 25 is an apparatus for wireless communication at a device (e.g., a UE) including one or more memories and one or more processors coupled to the one or more memories and, based at least in part on information stored in the one or more memories, the one or more processors are configured, individually or in combination, to cause the device to implement any of aspects 1 to 11.

Aspect 26 is an apparatus for wireless communication at a device including means for implementing any of aspects 1 to 11.

Aspect 27 is a computer-readable medium (e.g., a non-transitory computer-readable medium) storing computer executable code, where the code when executed by at least one processor causes the at least one processor to implement any of aspects 1 to 11.

Aspect 28 is an apparatus for wireless communication at a device (e.g., a network node) including at least one memory and at least one processor coupled to the at least one memory and, based at least in part on information stored in the at least one memory, the at least one processor is configured, individually or in combination, to cause the device to implement any of aspects 12 to 21.

Aspect 29 is an apparatus for wireless communication at a device (e.g., a network node) including at least one memory and at least one processor coupled to the at least one memory and configured, individually or in combination, to cause the device to implement any of aspects 12 to 21.

Aspect 30 is the apparatus of aspect 28 or 29, further including one or more transceivers or one or more antennas coupled to the at least one processor.

Aspect 31 is an apparatus for wireless communication at a device (e.g., a network node) including one or more memories and one or more processors coupled to the one or more memories and, based at least in part on information stored in the one or more memories, the one or more processors are configured, individually or in combination, to cause the device to implement any of aspects 12 to 21.

Aspect 32 is an apparatus for wireless communication at a device including means for implementing any of aspects 12 to 21.

Aspect 33 is a computer-readable medium (e.g., a non-transitory computer-readable medium) storing computer executable code, where the code when executed by at least one processor causes the at least one processor to implement any of aspects 12 to 21.

What is claimed is:

1. An apparatus for wireless communication at a user equipment (UE), comprising:
   at least one memory; and
   at least one processor coupled to the at least one memory and, based at least in part on stored information that is stored in the at least one memory, the at least one processor, individually or in any combination, is configured to cause the apparatus to:
   receive, from a network node, at least one channel state information reference signal (CSI RS);
   transmit, to the network node, information indicative of at least one power associated with a post-processing frequency domain residual sideband and a noise per each antenna associated with the UE in a channel state feedback (CSF) report based on the at least one CSI RS; and
   receive, from the network node, a power allocation configuration based on the information indicative of the at least one power associated with the post-processing frequency domain residual sideband and the noise per each antenna associated with the network node.

2. The apparatus of claim 1, wherein the at least one CSI RS comprises a set of CSI RSs, and wherein each CSI RS in the set of CSI RSs respectively correspond to one particular antenna associated with the network node.

3. The apparatus of claim 1, wherein the at least one power comprises a set of powers, wherein each power in the set of powers correspond to a respective flatness group in a set of flatness groups associated with the UE, wherein the set of flatness groups span a frequency spectrum associated with the UE, and wherein each flatness group in the set of flatness groups is associated with a respective subset of subcarriers associated with the frequency spectrum where the post-processing frequency domain residual sideband is within a respective threshold.

4. The apparatus of claim 3, wherein the at least one processor is configured to cause the apparatus to:

receive, from the network node upon establishing a connection with the network node, a configuration of the set of flatness groups.

5. The apparatus of claim 3, wherein the at least one processor is configured to cause the apparatus to:
receive, from the network node, a configuration of the set of flatness groups, wherein the configuration of the set of flatness groups is uniquely associated with the network node and the UE.

6. The apparatus of claim 3, wherein the at least one processor is configured to cause the apparatus to:
determine, for each flatness group in the set of flatness groups, the respective subset of subcarriers associated with the frequency spectrum where the post-processing frequency domain residual sideband is within the respective threshold; and
determine a configuration of the set of flatness groups.

7. The apparatus of claim 6, wherein the at least one processor is configured to cause the apparatus to:
transmit, to the network node, the configuration of the set of flatness groups upon establishing a connection with the network node.

8. The apparatus of claim 6, wherein the at least one processor is configured to cause the apparatus to:
transmit, to the network node, the configuration of the set of flatness groups, wherein the configuration of the set of flatness groups is uniquely associated with the network node and the UE.

9. The apparatus of claim 1, wherein the power allocation configuration is configured to allocate at least one transmit power for at least one subsequent slot based on the at least one power.

10. The apparatus of claim 9, wherein the at least one subsequent slot comprises a quantity of slots before a next CSF report with additional information indicative of at least one second power associated with the post-processing frequency domain residual sideband and the noise per each antenna.

11. The apparatus of claim 1, wherein the at least one processor is configured to cause the apparatus to:
iteratively perform a channel estimation; and
estimate the post-processing frequency domain residual sideband based on the channel estimation and the at least one CSI RS.

12. An apparatus for wireless communication at a network node, comprising:
at least one memory; and
at least one processor coupled to the at least one memory and, based at least in part on stored information that is stored in the at least one memory, the at least one processor, individually or in any combination, is configured to cause the apparatus to:
transmit, for a user equipment (UE), at least one channel state information reference signal (CSI RS);
receive information indicative of at least one power associated with a post-processing frequency domain residual sideband and a noise per each antenna associated with the UE in a channel state feedback (CSF) report based on the at least one CSI RS; and
transmit, for the UE, a power allocation configuration based on the information indicative of the at least one power associated with the post-processing frequency domain residual sideband and the noise per each antenna associated with the network node.

13. The apparatus of claim 12, wherein the at least one CSI RS comprises a set of CSI RSs, and wherein each CSI RS in the set of CSI RSs respectively correspond to one particular antenna associated with the network node.

14. The apparatus of claim 12, wherein the at least one power comprises a set of powers, wherein each power in the set of powers correspond to a respective flatness group in a set of flatness groups associated with the UE, wherein the set of flatness groups span a frequency spectrum associated with the UE, and wherein each flatness group in the set of flatness groups is associated with a respective subset of subcarriers associated with the frequency spectrum where the post-processing frequency domain residual sideband is within a respective threshold.

15. The apparatus of claim 14, wherein the at least one processor is configured to cause the apparatus to:
determine, for each flatness group in the set of flatness groups, the respective subset of subcarriers associated with the frequency spectrum where the post-processing frequency domain residual sideband is within the respective threshold; and
determine a configuration of the set of flatness groups.

16. The apparatus of claim 15, wherein the at least one processor is configured to cause the apparatus to:
transmit, for the UE upon establishing a connection with the UE, the configuration of the set of flatness groups.

17. The apparatus of claim 15, wherein the at least one processor is configured to cause the apparatus to:
transmit, for the UE, the configuration of the set of flatness groups, wherein the configuration of the set of flatness groups is uniquely associated with the network node and the UE.

18. The apparatus of claim 14, wherein the at least one processor is configured to cause the apparatus to:
receive a configuration of the set of flatness groups upon establishing a connection with the UE.

19. The apparatus of claim 14, wherein the at least one processor is configured to cause the apparatus to:
receive a configuration of the set of flatness groups, wherein the configuration of the set of flatness groups is uniquely associated with the network node and the UE.

20. The apparatus of claim 12, wherein the power allocation configuration is configured to allocate at least one transmit power for at least one subsequent slot based on the at least one power.

21. The apparatus of claim 20, wherein the at least one subsequent slot comprises a quantity of slots before a next CSF report with additional information indicative of at least one second power associated with the post-processing frequency domain residual sideband and the noise per each antenna.

22. A method for wireless communication performed by a user equipment (UE), comprising:
receiving, from a network node, at least one channel state information reference signal (CSI RS);
transmitting, to the network node, information indicative of at least one power associated with a post-processing frequency domain residual sideband and a noise per each antenna associated with the UE in a channel state feedback (CSF) report based on the at least one CSI RS; and
receiving, from the network node, a power allocation configuration based on the information indicative of the at least one power associated with the post-processing frequency domain residual sideband and the noise per each antenna associated with the network node.

23. The method of claim 22, wherein the at least one CSI RS comprises a set of CSI RSs, and wherein each CSI RS in the set of CSI RSs respectively correspond to one particular antenna associated with the network node.

24. The method of claim 22, wherein the at least one power comprises a set of powers, wherein each power in the set of powers correspond to a respective flatness group in a set of flatness groups associated with the UE, wherein the set of flatness groups span a frequency spectrum associated with the UE, and wherein each flatness group in the set of flatness groups is associated with a respective subset of subcarriers associated with the frequency spectrum where the post-processing frequency domain residual sideband is within a respective threshold.

25. The method of claim 24, further comprising:
receiving, from the network node upon establishing a connection with the network node, a configuration of the set of flatness groups.

26. The method of claim 24, further comprising:
receiving, from the network node, a configuration of the set of flatness groups, wherein the configuration of the set of flatness groups is uniquely associated with the network node and the UE.

27. The method of claim 24, further comprising:
determining, for each flatness group in the set of flatness groups, the respective subset of subcarriers associated with the frequency spectrum where the post-processing frequency domain residual sideband is within the respective threshold; and
determining a configuration of the set of flatness groups.

28. The method of claim 27, further comprising:
transmitting, to the network node, the configuration of the set of flatness groups upon establishing a connection with the network node.

29. The method of claim 27, further comprising:
transmitting, to the network node, the configuration of the set of flatness groups, wherein the configuration of the set of flatness groups is uniquely associated with the network node and the UE.

30. An method for wireless communication at a network node, comprising:
transmitting, for a user equipment (UE), at least one channel state information reference signal (CSI RS);
receiving information indicative of at least one power associated with a post-processing frequency domain residual sideband and a noise per each antenna associated with the UE in a channel state feedback (CSF) report based on the at least one CSI RS; and
transmitting, for the UE, a power allocation configuration based on the information indicative of the at least one power associated with the post-processing frequency domain residual sideband and the noise per each antenna associated with the network node.

* * * * *